United States Patent
Amann et al.

(10) Patent No.: US 12,124,273 B2
(45) Date of Patent: Oct. 22, 2024

(54) METHOD AND SYSTEM FOR DELIMITING AND MONITORING AT LEAST ONE WORKING AREA FOR AT LEAST ONE AUTONOMOUSLY OPERATED VEHICLE

(71) Applicant: ZF Friedrichshafen AG, Friedrichshafen (DE)

(72) Inventors: Michael Amann, Tettnang (DE); Marcus Hiemer, Meckenbeuren (DE)

(73) Assignee: ZF FRIEDRICHSHAFEN AG, Friedrichshafen (DE)

(*) Notice: Subject to any disclaimer, the term of this patent is extended or adjusted under 35 U.S.C. 154(b) by 186 days.

(21) Appl. No.: 17/429,739

(22) PCT Filed: Feb. 3, 2020

(86) PCT No.: PCT/EP2020/052544
§ 371 (c)(1),
(2) Date: Aug. 10, 2021

(87) PCT Pub. No.: WO2020/164937
PCT Pub. Date: Aug. 20, 2020

(65) Prior Publication Data
US 2022/0100194 A1 Mar. 31, 2022

(30) Foreign Application Priority Data
Feb. 11, 2019 (DE) .............. 10 2019 201 692.8

(51) Int. Cl.
*G05D 1/00* (2024.01)
*A01B 69/00* (2006.01)

(52) U.S. Cl.
CPC .......... *G05D 1/028* (2013.01); *G05D 1/0265* (2013.01); *G05D 1/0291* (2013.01); *A01B 69/004* (2013.01)

(58) Field of Classification Search
CPC .... G05D 1/028; G05D 1/0265; G05D 1/0291; G05D 2201/0201; A01B 69/004
See application file for complete search history.

(56) References Cited

U.S. PATENT DOCUMENTS 10,459,452 B2   10/2019  Eagling et al.
10,820,493 B2   11/2020  Ritzer et al.
(Continued)

FOREIGN PATENT DOCUMENTS

CN   102470884 A     5/2012
CN   109557909 A  *  4/2019  ........... A01D 34/001
(Continued)

OTHER PUBLICATIONS

English Translation of CN-109557909-A (Year: 2019).*
English Translation for JP-2013164743-A (Year: 2013).*

*Primary Examiner* — Rachid Bendidi
*Assistant Examiner* — Moises Gasca Alva
(74) *Attorney, Agent, or Firm* — LEYDIG, VOIT & MAYER, LTD.

(57) ABSTRACT

A method for delimiting and monitoring at least one working area for at least one autonomously operated vehicle includes transmitting, by a transmitter and receiver unit, an output signal through a signal loop. The transmitter and receiver unit is arranged outside the vehicle and is connected using signaling technology to the signal loop. The method further includes comparing the transmitted output signal with an input signal received from the signal loop, determining, by the transmitter and receiver unit, a malfunction of the signal loop in response to a deviation between the output signal and the input signal, and initiating a securing sequence for the autonomous driving operation of the at least one vehicle.

9 Claims, 1 Drawing Sheet

(56) References Cited

U.S. PATENT DOCUMENTS

| | | | |
|---|---|---|---|
| 2004/0199306 A1 | 10/2004 | Heilmann et al. | |
| 2008/0097645 A1* | 4/2008 | Abramson | G01S 11/06 |
| | | | 700/258 |
| 2011/0202307 A1 | 8/2011 | Petereit et al. | |
| 2012/0181392 A1 | 7/2012 | David et al. | |
| 2013/0110322 A1* | 5/2013 | Jagenstedt | A01D 34/008 |
| | | | 701/2 |
| 2013/0211648 A1 | 8/2013 | Yamamura et al. | |
| 2014/0379196 A1* | 12/2014 | Da Rocha | B60L 50/52 |
| | | | 901/1 |
| 2016/0000005 A1* | 1/2016 | Sjöholm | B60L 53/14 |
| | | | 700/258 |
| 2016/0109241 A1* | 4/2016 | Eguchi | G05D 1/0265 |
| | | | 701/23 |
| 2016/0174459 A1* | 6/2016 | Balutis | B25J 9/1674 |
| | | | 701/25 |
| 2016/0291596 A1* | 10/2016 | Ebrahimi Afrouzi | |
| | | | G05D 1/0234 |

FOREIGN PATENT DOCUMENTS

| | | | | |
|---|---|---|---|---|
| DE | 10259168 A1 | 7/2004 | | |
| DE | 102009001900 A1 | 4/2010 | | |
| DE | 102014226077 A1 | 6/2016 | | |
| EP | 3412131 A1 | 12/2018 | | |
| JP | 2013164743 A * | 8/2013 | | G05D 1/021 |
| WO | WO 2018182478 A1 | 10/2018 | | |

* cited by examiner

METHOD AND SYSTEM FOR DELIMITING AND MONITORING AT LEAST ONE WORKING AREA FOR AT LEAST ONE AUTONOMOUSLY OPERATED VEHICLE

CROSS REFERENCE TO RELATED APPLICATIONS

This application is a U.S. National Phase application under 35 U.S.C. § 371 of International Application No. PCT/EP2020/052544, filed on Feb. 3, 2020, and claims benefit to German Patent Application No. DE 10 2019 201 692.8, filed on Feb. 11, 2019. The International Application was published in German on Aug. 20, 2020 as WO 2020/164937 A1 under PCT Article 21(2).

FIELD

The present disclosure relates to a method and a system for delimiting and monitoring at least one working area for at least one autonomously operated vehicle.

BACKGROUND

DE 10 259 168 A1 discloses a method for controlling at least one autonomously driving vehicle in a delimited traffic area, wherein the autonomous vehicle has a driving device for executing driving commands based on supplied signals. The driving commands relate to both driving direction and driving speed. The vehicle determines its current position by means of a position determination device and transmits it to an operating control center. In the operating control center, a route profile to be driven is determined from the position signals on the basis of definable criteria and transmitted to the driving device of the vehicle, wherein the driving device generates the driving commands required to drive the route profile.

SUMMARY

In an embodiment, the present disclosure provides a method for delimiting and monitoring at least one working area for at least one autonomously operated vehicle, wherein a transmitter and receiver unit arranged outside the vehicle is connected using signaling technology to at least one signal loop. The method includes transmitting, by the transmitter and receiver unit, an output signal through the signal loop. The method further includes comparing the transmitted output signal with an input signal received from the signal loop, determining, by the transmitter and receiver unit, a malfunction of the signal loop in response to a deviation between the output signal and the input signal, and initiating a securing sequence for the autonomous driving operation of the at least one vehicle.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
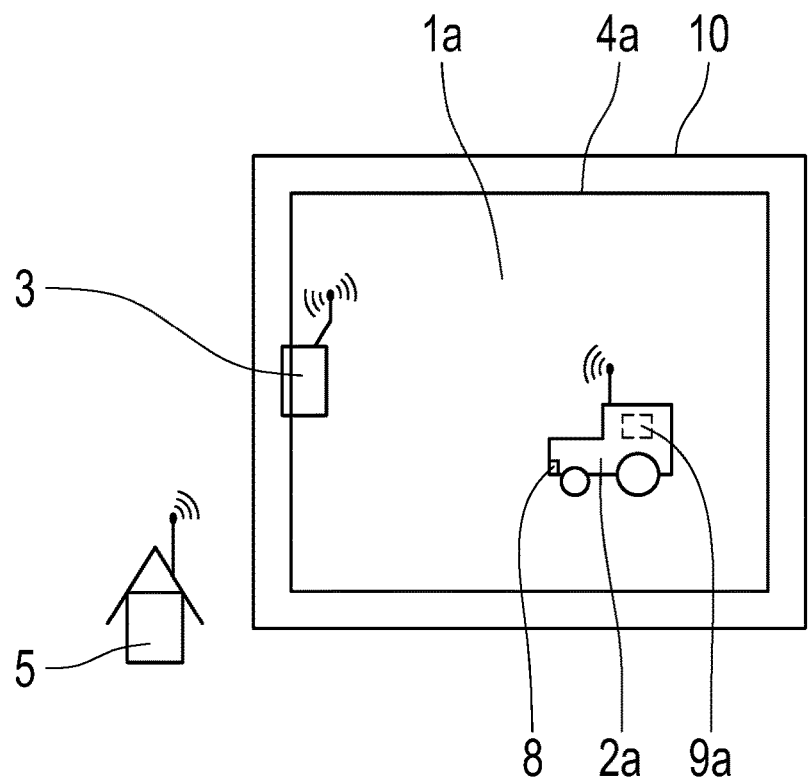
FIG. 1 is a simplified schematic representation of a system for delimiting and monitoring a working area for a plurality of autonomously operated vehicles according to a first embodiment.

The present disclosure provides a method and a system for delimiting and monitoring at least one working area for at least one autonomously operated vehicle, by means of which the driving operation of the respective vehicle is designed to be more secure.

According to a method for delimiting and monitoring at least one working area for at least one autonomously operated vehicle, a transmitter and receiver unit arranged outside the vehicle is connected using signaling technology to at least one signal loop, by means of which the respective working area is delimited, wherein the transmitter and receiver unit transmits an output signal through the signal loop in order to monitor the working area and compares it with an input signal received from the signal loop, wherein the transmitter and receiver unit determines a malfunction of the signal loop in the event of a deviation between the output and input signals and subsequently initiates a securing sequence for the autonomous driving operation of at least one vehicle. The method makes the operation of the at least one autonomously operated vehicle more secure, wherein malfunctions of the respective signal loop, such as interferences, short circuits, failures, interruptions or interfering signals, are made detectable by the transmitter and receiver unit. A corresponding securing sequence is initiated on the basis of the determination for malfunction. The securing sequence can be, for example, a braking or a complete deactivation of the respective vehicle. This advantageously increases the safety of the driving operation of the respective autonomously operated vehicle. For example, a predefined securing sequence is predetermined for a specific malfunction of the signal loop.

Vehicles are preferably understood to mean work machines, agricultural utility vehicles or machines (agricultural engineering) and utility vehicles in port operations, which are operated autonomously. The vehicles have in common that they are operated in an off-road environment.

The transmitter and receiver unit is configured such that, on the one hand, it can input or impress an output signal into the respective signal loop and, on the other hand, it can receive the output signal again, namely as an input signal. In this case, the transmitter and receiver unit forms a circuit together with the signal loop, wherein the transmitter and receiver unit introduces the output signal into the signal loop and subsequently receives such signal as an input signal. In other words, the transmitter and receiver unit has a transmitter side and a receiver side, wherein the transmitter and receiver sides can each be equipped with a control unit for performing the comparison of the signals. Accordingly, the output signal is transmitted on the transmitter side and received as an input signal on the receiver side.

In an error-free course through the respective signal loop, the output signal goes back into the transmitter and receiver unit in an unadulterated or unchanged or unaffected form. Consequently, the output signal then corresponds to the input signal. In an erroneous course of the signal through the respective signal loop, the output signal is, for example, aborted or changed or affected such that the input signal no longer corresponds to the output signal originally introduced into the signal loop, such that there is a malfunction of the signal loop that is detected by the transmitter and receiver unit.

The output signal and the input signal are preferably an analog or digital signal. An analog signal is, for example, a signal with different voltage levels or a sine signal with predefined frequency. So-called pulse-width-modulated (PWM) signals are conceivable as digital signals. In addition, it is likewise possible to use a communication protocol in the form of a bus protocol.

The output signal is preferably transmitted continuously or at defined points in time by the transmitter and receiver unit. Depending on the type of signal and/or requirements profile for the system, a suitable output signal, that is, either a pulsed or continuous output signal, can thereby be generated.

The respective vehicle is preferably encoded in at least one of the working areas. A working area is a surface on which the respective autonomously operated vehicle can move, wherein the surface is delimited by an associated signal loop.

An encoding of the vehicle is to be understood as meaning that the respective vehicle is first placed in the respective working area and is subsequently commissioned, so to speak, with respect to the respective output signal of the transmitter and receiver unit and of the signal loop delimiting the working area. The respective encoded vehicle can thus be operated and driven exclusively in the working area in which it is registered or commissioned.

An approaching or exceeding of the respective vehicle to or over the signal loop causes the aforementioned malfunction, which initiates the securing sequence for the autonomous driving operation of the at least one vehicle. The securing sequence preferably comprises a command signal originating from the transmitter and receiver unit to at least one vehicle and/or to an external receiving station. The respective vehicle or the external receiving station are preferably wirelessly connected to the transmitter and receiver unit. In this case, the vehicle is, for example, in constant contact with the transmitter and receiver unit. In order to reduce the supply costs, a cable connection is likewise conceivable.

If the transmitter and receiver unit determines a malfunction of the respective signal loop, for example if the output signal is changed or affected by a vehicle driving over the signal loop, based on the deviation of the original output signal from the input signal, a command signal is generated, which command signal is sent either to the respective vehicle and/or to the external receiving station. The receiving station can be, for example, a device of an operator, a PC or a mobile phone. In this case, it is conceivable that the operator is informed of the malfunction and can additionally act remotely on the driving operation of the at least one autonomous vehicle, in order to ensure the sufficient safety of the system in the event of a malfunction.

If the command signal goes directly to the respective vehicle, it can execute the action characterizing the corresponding securing sequence after receiving the command signal. This can be either an independent deactivation, a braking until standstill or an automatic change in the movement route of the respective vehicle.

According to a system for delimiting and monitoring at least one working area for at least one autonomously operated vehicle, a transmitter and receiver unit arranged outside the vehicle is connected using signaling technology to at least one signal loop, which delimits the respective working area, wherein the transmitter and receiver unit transmits an output signal through the signal loop in order to monitor the working area and compares it with an input signal received from the signal loop, wherein a malfunction of the signal loop can be determined by the transmitter and receiver unit in the event of a deviation between the output and input signals and a securing sequence for the autonomous driving operation of at least one vehicle can subsequently be introduced therefrom. Consequently, this is an active delimiting and monitoring system that detects malfunctions of the respective signal loop, such as interferences, failures, interruptions or interfering signals, and initiates a corresponding securing sequence based on such determinations. The system can be used, for example, in harvesting work in agriculture or for transportation work in the port area, where an autonomous driving operation of the vehicles arranged in the working area can be designed to be particularly helpful and efficient.

The respective signal loop preferably comprises a metallic signal line. The metallic signal line is preferably embedded in the floor and serves as a field boundary or as a boundary of the working area of the respective vehicle. The respective vehicle commissioned in the working area is configured such that it recognizes its output signal when approaching the respective signal loop. In other words, the respective vehicle identifies the metallic signal line as a signal loop. In this case, it is advantageous that the vehicle can distinguish the signal loop from other metallic objects that may possibly be present in the ground. Consequently, the system is formed to be secure against metallic interfering objects.

Furthermore, the respective vehicle preferably comprises a sensor unit, in order to detect the output signal of the respective signal loop. The aforementioned distinction between the signal loop and other metallic objects can also be made by means of the sensor unit.

If the respective vehicle approaches the signal loop, this is detected by the sensor unit of the respective vehicle and transmitted to the transmitter and receiver unit. Based thereon, the driving operation of the autonomous vehicle can be adjusted such that, for example, a change in direction or a change in the movement route of the respective vehicle can take place. By means of the sensor unit, the vehicle is designed to independently determine whether it is located within the signal loop of the respective working area.

The respective vehicle preferably comprises a transmitter that is configured to at least temporarily affect the output signal of the respective signal loop. The term "at least temporarily" is to be understood to mean that the output signal is either altered or affected or completely changed or affected by the transmitter for a defined time period. In this case, each vehicle can transmit a specific signal with which the respective signal loop is affected. In this case, the system is configured to use the signal change for the exact identification of the respective vehicle and/or to distinguish it from other vehicles. In other words, the monitoring of the respective signal loop, which is to be understood as a virtual boundary or fence for the respective vehicle selected or encoded in the working area, is carried out not only by the vehicle itself but also redundantly by the system or the transmitter and receiver unit, as the case may be. In addition to increasing the security, this also realizes the fault-tolerant monitoring of the respective working area.

According to one embodiment, a plurality of working areas is provided, which are delimited by a respective signal loop, wherein each of at least two working areas is arranged so as to overlap at least in sections, in order to form a transition area between at least two working areas. Using the example of two working areas with a respective signal loop, at least one vehicle can be commissioned in the first working area and at least one additional vehicle can be commissioned in the second working area. At least one third vehicle can furthermore be encoded into both the first working area and the second working area. In other words, the first vehicle is authorized to move exclusively in the first working area. Due to the delimitation by the first signal loop, it is not possible to drive the first vehicle out of the first working area, without triggering a malfunction of the first signal loop. The second vehicle is authorized to drive exclusively in the second working area. Accordingly, due to the delimitation by the second signal loop, it is not possible for the second vehicle to drive out of the second working area without triggering a malfunction of the second signal loop.

Only the third vehicle with the encoding or authorization for both working areas can travel both in the first working area and in the second working area. The transition area between the two working areas serves as a transfer area, which forms a surface into which all three vehicles can move without crossing the respective boundary in the form of the signal loop without permission, because they are located in both the first working area and the second working area. The third vehicle may pass over or traverse the first signal loop of the first working area only if it is located within the second signal loop of the second working area, i.e., in the transition area, and vice versa. In other words, if the vehicle is located in the transition area, it can be recoded by the first working area into the second working area, or vice versa. In the transition area, the vehicle is thus recommissioned between the first working area and the second working area.

According to FIG. 1, a first embodiment of a system for delimiting and monitoring a working area 1a for at least one autonomously operated vehicle 2a is shown. The system comprises a separately arranged transmitter and receiver unit 3, which is connected using signaling technology to a signal loop 4a formed as a metallic signal line, wherein the signal loop 4a delimits the working area 1a. The working area 1a is part of a field 10, for example a grain field, which is driven on by the vehicle 2a, which may be an agricultural utility vehicle, in order to drive on the working area 1a. In the present example, the system comprises only a single vehicle 2a, which is arranged within the working area 1a and operated autonomously therein.

In the present case, the transmitter and receiver unit 3 generates an analog output signal, which is transmitted continuously through the signal loop 4a in order to monitor the working area 1a. After passing through the signal loop 4a, the output signal is received by the transmitter and receiver unit 3 as an input signal on the receiver side, wherein the input signal is compared with the originally introduced output signal. In other words, the two signals are superimposed in order to determine a possible deviation. In the case of an error-free course of the output signal through the signal loop 4a, there is no deviation between the output signal and the input signal after a comparison. In contrast, the transmitter and receiver unit 3 determines a deviation if the output signal is not identical to the input signal. A malfunction, for example an interruption, an interference or a failure of the signal within the signal loop 4a, is then present within the signal loop 4a. A malfunction is further detected if the vehicle 2a touches or crosses the signal loop 4a.

Based on this determination for malfunction, the transmitter and receiver unit 3 initiates a securing sequence for the autonomous driving operation of the vehicle 2a, which securing sequence affects the driving operation of the vehicle 2a. A securing sequence can be, for example, the transmission of a command signal to the at least one vehicle 2a and/or the transmission of a command signal to an external receiving station 5, i.e., a receiving station 5 arranged outside the signal loop 4a, which can be, for example, a device of an operator of the vehicle 2a. In the present case, the receiving station 5 and the vehicle 2a are coupled to the transmitter and receiver unit 3 via a radio link for data exchange. For example, an emergency stop or a deactivation of the vehicle 2a can be triggered by means of the command signal.

In the present case, the vehicle 2a comprises a sensor unit 8, in order to detect the output signal of the signal loop 4a. When approaching the signal loop 4a, the vehicle 2a can detect the output signal of the signal loop 4a. Furthermore, the vehicle 2a is encoded in the working area 1a with an encoding 9a. This means that the vehicle 2a is configured in such a way that it can determine, on the basis of the output signal detected by the sensor unit 8, whether it is located within the working area 1a delimited by the signal loop 4a. If the vehicle 2a drives through the signal loop 4a, it can also detect whether it is located within or outside the working area 1a, whereby the driving operation of the vehicle 2a can be deactivated or adjusted such that the vehicle 2a travels back into the working area 1a. For this purpose, the sensor unit 8 can be connected to a control unit (not shown here), which evaluates the detected data of the sensor unit 8 and can accordingly act on the driving operation of the vehicle 2a.

If the vehicle 2a determines that it is no longer located in the working area 1a or has just crossed over the signal loop 4a, a malfunction of the signal loop 4a is detected and the securing sequence is subsequently initiated. The safety of the system is thereby increased, and a diagnostic capability of the signal loop 4a is realized.

Figure 2:
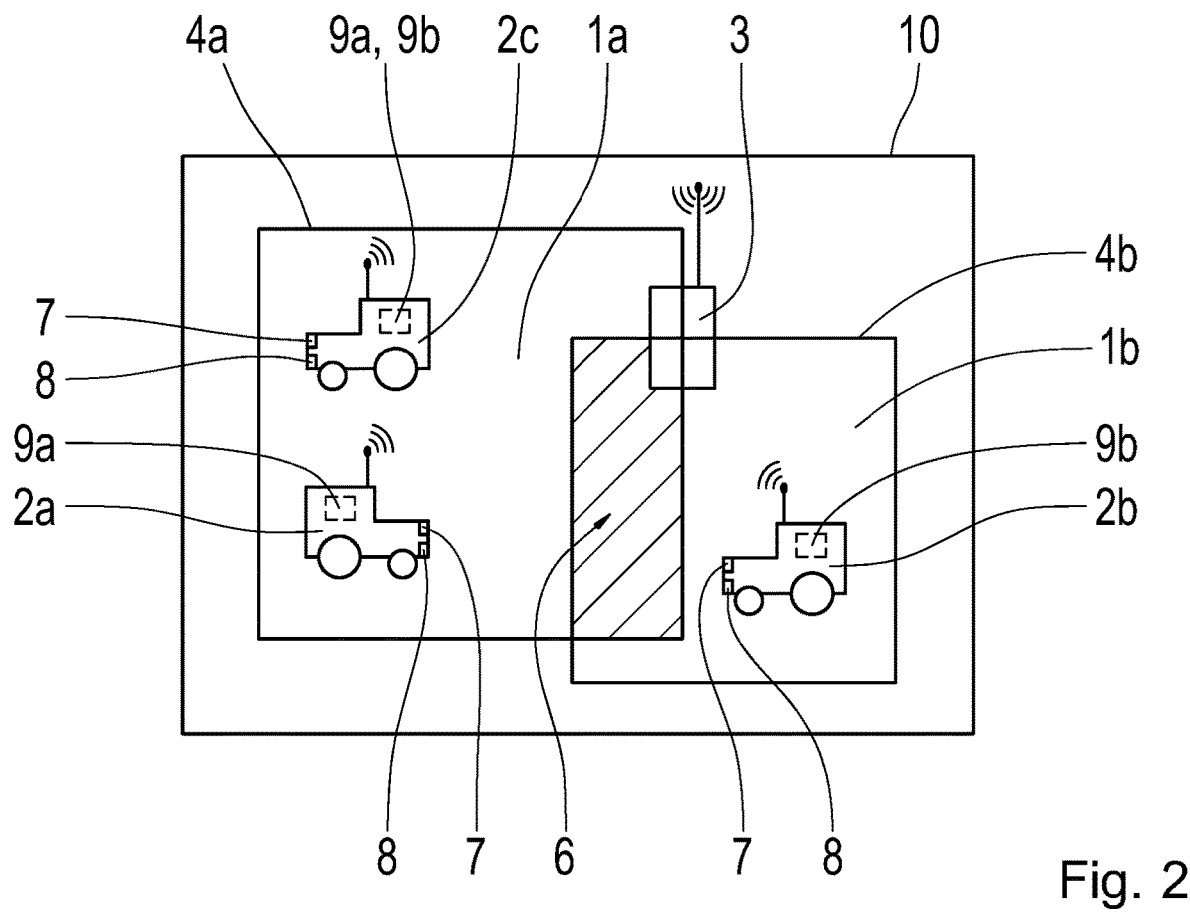
FIG. 2 is a simplified schematic representation of a system according to a second embodiment.

According to FIG. 2, a second embodiment of the system for delimiting and monitoring at least one working area 1a, 1b is shown. The mode of operation of the system essentially corresponds to the description regarding FIG. 1. In contrast to the first embodiment, the system has two operating areas 1a, 1b, which are delimited by a respective signal loop 4a, 4b, wherein three vehicles 2a, 2b, 2c are operated autonomously in the first and/or in the second operating area 1a, 1b. The two working areas 1a, 1b are arranged in a manner partially superimposed on one another, wherein a transition area 6 is formed between the two working areas 1a, 1b in the superimposed area. The transmitter and receiver unit 3 is arranged in an interface between the two signal loops 4a, 4b.

In the present case, the first vehicle 2a is encoded in such a way that it can autonomously travel exclusively within the first working area 1a delimited by the first signal loop 4a. The first vehicle 2a thus has a first encoding 9a. In contrast, the second vehicle 2b is encoded in such a way that it can autonomously travel exclusively within the second working area 1b delimited by the second signal loop 4b. The second vehicle 2b thus has a second encoding 9b. The third vehicle 2c is encoded both in the first working area 1a and in the second working area 1b and can thus move autonomously in both working areas 1a, 1b. The third vehicle 2c accordingly has both the first and the second encoding 9a, 9b.

The third vehicle 2c is encoded in such a way that a transition of the vehicle 2c from the first working area 1a into the second working area 1b and vice versa is possible. In this case, the transition is only possible if the third vehicle 2c passes through the transition area 6. In the transition area 5, the respective vehicle is simultaneously located within the two working areas 1a, 1b. It is also possible, for example, for the first encoding 9a of the first vehicle 2a to be replaced by the second encoding 9b if it is located in the transition area 6, such that the first vehicle 2a is recommissioned, so to speak. As a result, the first vehicle 2a can subsequently move exclusively in the second working area 1b. Individual encodings 9a, 9b can thus be deleted or added in the transition area 6.

In the second embodiment, the vehicles 2a, 2b, 2c further comprise a transmitter 7, which is configured to at least temporarily affect the output signal of the respective signal loop 4a, 4b. For this purpose, the transmitter 7 of the respective vehicle 2a, 2b, 2c emits a specific signal that is different from the other signals and is provided to change or affect the output signal in the respective signal loop 4a, 4b in such a way that the transmitter and receiver unit 3 does not detect a malfunction of the signal loop 4a, 4b, but rather the approach of the respective vehicle 2a, 2b, 2c to the signal loop 4a. In other words, the transmitter and receiver unit 3 stores the specific signal, which is to be expected in the event that the vehicle 2a approaches the signal loop 4a. Furthermore, the transmitter and receiver unit 3 is capable of detecting whether or not the vehicle 2a, 2b, 2c is still located within the respective working area 1a, 1b. Based on the specific signals, the system can also detect precisely which vehicle 2a, 2b, 2c has approached the respective signal loop 4a, 4b.

If the vehicle 2a and/or the transmitter and receiver unit 3 determines that one of the vehicles 2a, 2b, 2c is no longer present in the respective working area 1a, 1b, the securing sequence is initiated by the transmitter and receiver unit 3.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS 1a, 1b Working area
2a, 2b, 2c Vehicle
3 Transmitter and receiver unit
4a, 4b Signal loop
5 Receiving station
6 Transition area
7 Transmitter
8 Sensor unit
9a, 9b Encoding
10 Field

The invention claimed is:

1. A method for delimiting and monitoring at least two working areas for at least one autonomously operated vehicle, wherein a transmitter and receiver unit arranged outside the at least one autonomously operated vehicle is connected using signaling technology to at least one signal loop, the method comprising:
transmitting, by the transmitter and receiver unit, an output signal through the signal loop,
comparing the transmitted output signal with an input signal received from the signal loop,
determining, by the transmitter and receiver unit, a malfunction of the signal loop in response to a deviation between the output signal and the input signal detected as a result of the comparison of the transmitted output signal with the input signal, and
initiating a securing sequence for an autonomous driving operation of the at least one autonomously operated vehicle,
wherein a plurality of working areas are each delimited by a respective signal loop,
wherein each of at least two working areas is arranged so as to overlap the other at least in sections in order to form a transition area between at least two overlapping working areas, and
wherein an assignment of the at least one autonomously operated vehicle is changed from one of the at least two overlapping working areas to the other of the at least two overlapping working areas only when the at least one autonomously operated vehicle is in the transition area,
wherein each of the at least one autonomously operated vehicles is equipped with a respective transmitter, which is configured to at least temporarily affect the output signal of the respective signal loop of the at least one signal loops.

2. The method according to claim 1, wherein the output signal is an analog or a digital signal and the input signal is an analog or digital signal.

3. The method according to claim 1, wherein the output signal is transmitted by the transmitter and receiver unit continuously or at defined points in time.

4. The method according to claim 1, wherein the securing sequence comprises a command signal originating from the transmitter and receiver unit to the at least one autonomously operated vehicle or to an external receiving station.

5. The method according to claim 1, wherein each of the at least one autonomously operated vehicles is encoded in at least one of the working areas.

6. A system for delimiting and monitoring at least one working area for at least one autonomously operated vehicle, comprising:
a transmitter and receiver unit arranged outside the at least one autonomously operated vehicle; and
at least one signal loop, which delimits the respective working area,
wherein the transmitter and receiver unit is connected using signaling technology to the at least one signal loop,
wherein the transmitter and receiver unit transmits an output signal through the at least one signal loop in order to monitor the working area and compares it with an input signal received from the at least one signal loop, wherein a malfunction of the at least one signal loop can be determined by the transmitter and receiver unit in the event of a deviation between the output and input signals detected as a result of the comparison of the transmitted output signal with the input signal, and a securing sequence for an autonomous driving operation of the at least one autonomously operated vehicle can subsequently be introduced therefrom wherein a plurality of working areas are each delimited by a respective signal loop, wherein each of at least two working areas is arranged so as to overlap the other at least in sections in order to form a transition area between at least two overlapping working areas, and wherein an assignment of the at least one autonomously operated vehicle is changed from one of the at least two overlapping working areas to the other of the at least two overlapping working areas only when the at least one autonomously operated vehicle is in the transition area, wherein each of the at least one autonomously operated vehicles comprises a transmitter that is configured to at least temporarily affect the output signal of the respective signal loop of the at least one signal loops.

7. The system according to claim 6, wherein each signal loop comprises a metallic signal line.

8. The system according to claim 6, wherein each of the at least one autonomously operated vehicles is encoded in at least one of the working areas.

9. The system according to claim 6, wherein each of the at least one autonomously operated vehicles comprises a sensor unit configured to detect the output signal of the respective signal loop of the at least one signal loops.

* * * * *